April 9, 1929.  W. G. DRUMMOND  1,708,382
WEED EXTRACTING TOOL
Filed March 9, 1927
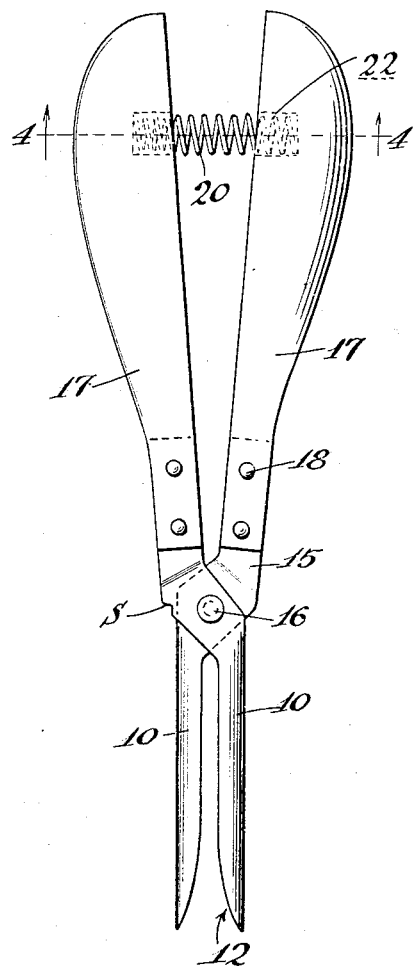
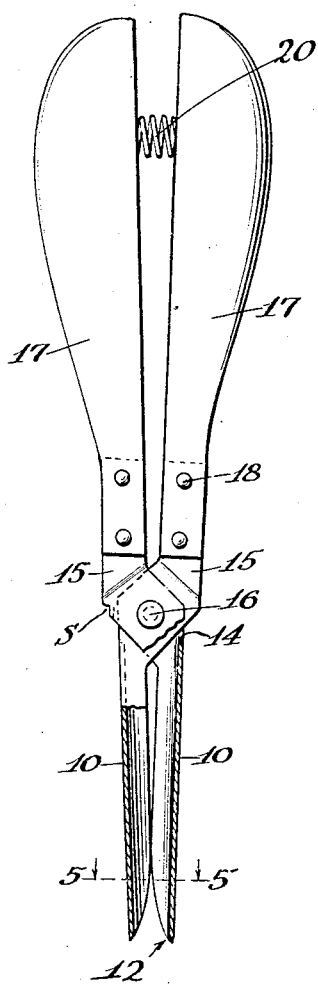
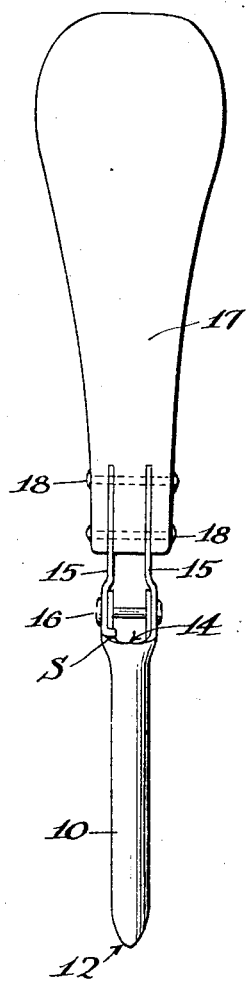
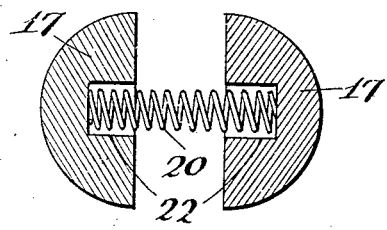
Inventor.
W. G. Drummond
Attorney.

Patented Apr. 9, 1929.

1,708,382

UNITED STATES PATENT OFFICE.

WILLIAM G. DRUMMOND, OF ALHAMBRA, CALIFORNIA.

WEED-EXTRACTING TOOL.

Application filed March 9, 1927. Serial No. 173,808.

The primary object of this invention is to provide a thoroughly efficient instrument for the removal of weeds by the roots, and one which when employed for weeding lawns will cause the minimum of damage thereto.

Another object is to produce a tool having the desirable qualities stated which shall at the same time be constructed along the lines of extreme simplicity and from a very few simple parts, thus insuring low manufacturing cost and low retail price.

Briefly stated, the invention comprises a pair of elongated pivoted jaws, channeled or concave in form, and sufficiently pointed to be capable of being easily thrust into the soil. Handles carried by the opposite ends of said jaws serve to manipulate the same, while the jaws themselves preferably are so pivoted and so shaped that when forced together they tend to form a tapered body of earth about the root, whereby the latter is firmly gripped. The invention resides further in such other features of novelty as may be herein presented.

In the accompanying drawings wherein one embodiment of the invention is illustrated by way of example.

Fig. 1 is a side elevation of the tool in position for inserting into the ground.

Fig. 2 is a similar view thereof with the jaws in gripping position, portions of said jaws being broken away.

Fig. 3 is a view at right angles to those of Figs. 1 and 2, and

Figs. 4 and 5 are cross sections taken on the lines 4—4 and 5—5 respectively of Figs. 1 and 2.

The weeder comprises two pressed steel jaws 10 substantially indentical in form, each being elongated and of channeled or particylindrical shape. Their extremities are tapered or pointed as indicated at 12 to facilitate their being thrust into the soil and also to permit their being pressed together somewhat to form a tapered core of the body of soil between them. The upper end of each jaw is bifurcated at 14 and the sides are bent into substantial parallelism to provide two spaced arms 15 as shown, the arms of one jaw lying between those of the other, a pintle 16 being passed through said arms 15 for pivoting the jaws thereupon. The arms 15 are set in wooden composition or other handles 17 and are secured therein by means of rivets or bolts 18, while a spring 20 whose ends are seated in sockets 22 in the handles, serves to urge the handles and jaws apart and into the position of Fig. 1 where they are ready for insertion into the soil. One of the jaws 10 is provided with a stop —S— to limit their movement away from each other and to maintain them in normally parallel relation.

In operation, the pointed ends 12 of the jaws are thrust into the ground thereby forming an approximately cylindrical core of earth enclosing the root of the weed to be removed. The handles 17 are then pressed together with the result that the jaws 10 are forced together at their outer ends as indicated in Fig. 2, thus compressing the earth core and forming it into a cross sectional shape somewhat as indicated at 25 in Fig. 5. This step serves to insure a firm grip upon the earth core and upon the root of the weed enclosed. Thus gripped, the whole may be twisted about a vertical axis, and the tearing away of all laterally directed rootlets not severed by the jaws is insured. An upward pull then serves to break the tap root, thus entirely loosening the weed. The earth core and the weed may then be removed with the tool, or the tool may be released and withdrawn freely so as to leave the earth core in the ground, whereupon the loosened weed may be readily removed by the operator's fingers.

What I claim is:

A weed extracting tool comprising a handle split longitudinally to form handle members, a pair of metal jaws of channel form having pointed lower ends secured to the lower ends of said handle members with their channels oppositely disposed, said jaws crossing each other at their upper ends and pivotally secured together, and a coiled spring disposed between the handle members at their upper ends, whereby to normally force the jaws towards each other and insure a grip upon the earth core when the tool is operated.

In witness that I claim the foregoing I have hereunto subscribed my name this 1st day of February, 1927.

WILLIAM G. DRUMMOND.